United States Patent
Iizuka et al.

(10) Patent No.: US 10,630,146 B2
(45) Date of Patent: Apr. 21, 2020

(54) ROTOR OF VEHICLE AC GENERATOR

(71) Applicant: Mitsubishi Electric Corporation, Tokyo (JP)

(72) Inventors: Shiro Iizuka, Tokyo (JP); Masao Akiyoshi, Tokyo (JP)

(73) Assignee: Mitsubishi Electric Corporation, Chiyoda-ku, Tokyo (JP)

( * ) Notice: Subject to any disclaimer, the term of this patent is extended or adjusted under 35 U.S.C. 154(b) by 352 days.

(21) Appl. No.: 15/541,498

(22) PCT Filed: May 27, 2015

(86) PCT No.: PCT/JP2015/065258
§ 371 (c)(1),
(2) Date: Jul. 5, 2017

(87) PCT Pub. No.: WO2016/189699
PCT Pub. Date: Dec. 1, 2016

(65) Prior Publication Data
US 2017/0358972 A1 Dec. 14, 2017

(51) Int. Cl.
*H02K 9/06* (2006.01)
*F04D 29/28* (2006.01)
(Continued)

(52) U.S. Cl.
CPC ............. *H02K 9/06* (2013.01); *F04D 25/082* (2013.01); *F04D 29/281* (2013.01);
(Continued)

(58) Field of Classification Search
CPC ...................................................... H02K 9/06
See application file for complete search history.

(56) References Cited

U.S. PATENT DOCUMENTS 3,301,472 A * 1/1967 Dixon .................. F04D 29/281
415/204
3,951,611 A * 4/1976 Morrill ................. F04D 29/325
428/587
(Continued)

FOREIGN PATENT DOCUMENTS

CN 102290921 A 12/2011
EP 0 779 697 A1 6/1997
(Continued)

OTHER PUBLICATIONS

Communication dated Dec. 6, 2018 from the European Patent Office in application No. 15893333.3.
(Continued)

*Primary Examiner* — Robert W Horn
(74) *Attorney, Agent, or Firm* — Sughrue Mion, PLLC; Richard C. Turner

(57) ABSTRACT

A rotor of a vehicle AC generator according to the present invention is the rotor of the vehicle AC generator which includes: magnetic pole cores; a field coil wound around the magnetic pole cores; and cooling fans fixed to the magnetic pole cores. In the rotor of the vehicle AC generator, each cooling fan includes: a base portion fixed to the axial end surfaces of the magnetic pole cores; a plurality of blade portions which are each axially arranged in a standing condition from the base portion; and a base rib which is provided in the base portion at a position apart from each root portion of the plurality of the blade portions and arranged in parallel to the extending direction of the blade portion.

5 Claims, 4 Drawing Sheets

(51) Int. Cl.
*F04D 25/08* (2006.01)
*F04D 29/32* (2006.01)
*F04D 25/06* (2006.01)

(52) U.S. Cl.
CPC ............ *F04D 29/329* (2013.01); *F04D 25/06* (2013.01); *H02K 2213/03* (2013.01)

(56) References Cited

U.S. PATENT DOCUMENTS

| | | | | |
|---|---|---|---|---|
| 4,492,885 | A * | 1/1985 | Kitamura | .................. H02K 9/06 310/62 |
| 5,685,695 | A * | 11/1997 | Klement | ............... F04D 29/281 416/182 |
| 6,078,116 | A | 6/2000 | Shiga et al. | |
| 6,448,687 | B2 * | 9/2002 | Higashino | ................ H02K 9/06 310/263 |
| 6,462,440 | B1 * | 10/2002 | Asao | ...................... H02K 1/243 310/51 |
| 6,800,972 | B2 * | 10/2004 | Buening | ............... F04D 29/281 310/263 |
| 7,121,798 | B2 * | 10/2006 | Braun | ..................... F04D 29/30 416/185 |
| 8,847,446 | B2 * | 9/2014 | Maley | .................... H02K 7/003 29/598 |
| 9,502,944 | B2 * | 11/2016 | Neet | ........................ H02K 9/06 |
| 10,014,755 | B2 * | 7/2018 | Neet | ........................ H02K 9/06 |
| 2003/0042806 | A1 | 3/2003 | Inaba et al. | |
| 2009/0184593 | A1 | 7/2009 | Kaizu | |
| 2017/0358972 | A1 * | 12/2017 | Iizuka | ..................... H02K 9/06 |

FOREIGN PATENT DOCUMENTS

| | | | |
|---|---|---|---|
| JP | 09-172752 | A | 6/1997 |
| JP | 09201009 | A | 7/1997 |
| JP | 3279258 | B2 | 4/2002 |
| JP | 2002186215 | A | 6/2002 |
| JP | 2009027788 | A | 2/2009 |
| JP | 4544309 | B2 | 9/2010 |
| JP | 2013-146120 | A | 7/2013 |

OTHER PUBLICATIONS

Communication dated Dec. 24, 2018, from State Intellectual Property Office of the P.R.C. in counterpart application No. 201580080201.X.
Communication dated Dec. 5, 2017 issued by the Japanese Patent Office in counterpart application No. 2017-520161.
Communication dated Jul. 3, 2018, issued by the Japan Patent Office in corresponding Japanese Application No. 2017-520161.
Communication dated May 10, 2019, from the Mexican Institute of Industrial Property in Counterpart Application No. MX/a/2017/015049.
International Search Report of PCT/JP2015/065258 dated Jul. 28, 2015.
Office Action dated Jun. 28, 2019 in Chinese Application No. 201580080201.X.
Communication dated Sep. 10, 2019 from the European Patent Office in application No. 15893333.3.

* cited by examiner

ROTOR OF VEHICLE AC GENERATOR

CROSS REFERENCE TO RELATED APPLICATIONS

This application is a National Stage of International Application No. PCT/JP2015/065258 filed May 27, 2015, the contents of which are incorporated herein by reference in its entirety.

TECHNICAL FIELD

The present invention relates to a rotor of a vehicle AC generator mounted on an automobile, a truck, and the like.

BACKGROUND ART

In recent years, reduction of vehicle exterior noise and silencing in vehicle compartment have been progressing and engine noise has been reducing; and accordingly, noise of a vehicle AC generator serving as an auxiliary machine that rotates in a relatively high speed has been regarded as more problematic than ever before.

As one of countermeasures, it is known that turbulence which is caused by a rib portion to be formed in a base portion and a blade portion of a cooling fan when the cooling fan equipped in a rotor of the vehicle AC generator rotates is made to flow smoothly by deleting the rib portion (see, for example, Patent Document 1).

On the other hand, centrifugal force is acted on a blade by rotation. In this case, as a countermeasure against leaning after receiving force in an outer diameter direction, there is shown one in which a cutout provided on the inner circumferential side of a blade portion is devised so as to be in perpendicular to the radial direction of a claw (see, for example, Patent Document 2).

Particularly, in the case where it is compelled to set a low strength blade in which only a part of the fan blade is coped with a magnetic pole claw by adopting unequal pitches in consideration of order dispersion of fan sound, it can be coped with by forming a cutout having a length of 2.2 times or less in a dimension R at the root of the fan blade.

PRIOR ART DOCUMENT

Patent Document

Patent Document 1: Japanese Patent Registration No. 3279258
Patent Document 2: Japanese Patent Registration No. 4544309

SUMMARY OF THE INVENTION

Problems to be Solved by the Invention

In the above-mentioned conventional rotor of the vehicle AC generator, when it is tried to obtain the fan that suppresses the turbulence by totally eliminating the ribs, actually, the strength of the fan that is a sheet metal product is insufficient. Accordingly, a problem lies in reliability and it cannot be actualized as the rotor of the vehicle AC generator which is continuously rotated and used in a vehicle.

In the case of applying the perpendicular cutout of Patent Document 2 in which it can be considered that the amount of deformation at the blade portion due to the centrifugal force is kept to an acceptable value or below in order to improve its reliability, the dimension of bend radius R in itself that becomes a base of setting length cannot be secured constantly and it is not realistic.

Furthermore, the cutouts in themselves are provided in plural numbers at positions of substantially the same diameter around a shaft and accordingly it is easily assumed that a crack is generated between adjacent cutouts to cause a breakage. That is, a problem exists in that it becomes difficult to secure the strength of the base portion.

The present invention has been made to solve the above described problem, and an object of the present invention is to provide a rotor of a vehicle AC generator capable of actualizing both of reliability and silent property.

Means for Solving the Problems

According to the present invention, there is provided a rotor of a vehicle AC generator which includes a magnetic pole core; a field coil wound around the magnetic pole core; and a cooling fan fixed to the magnetic pole core, in the rotor of the vehicle AC generator, the cooling fan includes: a base portion fixed to the axial end surface of the magnetic pole core; a plurality of blade portions which are each axially arranged in a standing condition from the base portion; and a base rib which is provided in the base portion at a position apart from a root portion of each of the plurality of the blade portions and is arranged in parallel to the extending direction of the blade portion.

Advantageous Effect of the Invention

According to the rotor of the vehicle AC generator according to the present invention, there can be obtained the rotor of the vehicle AC in which strength durable for rotation use can be secured, large turbulence is not caused, and reliability and silent property can be improved.

MODE FOR CARRYING OUT THE INVENTION

Embodiment 1

Figure 1:
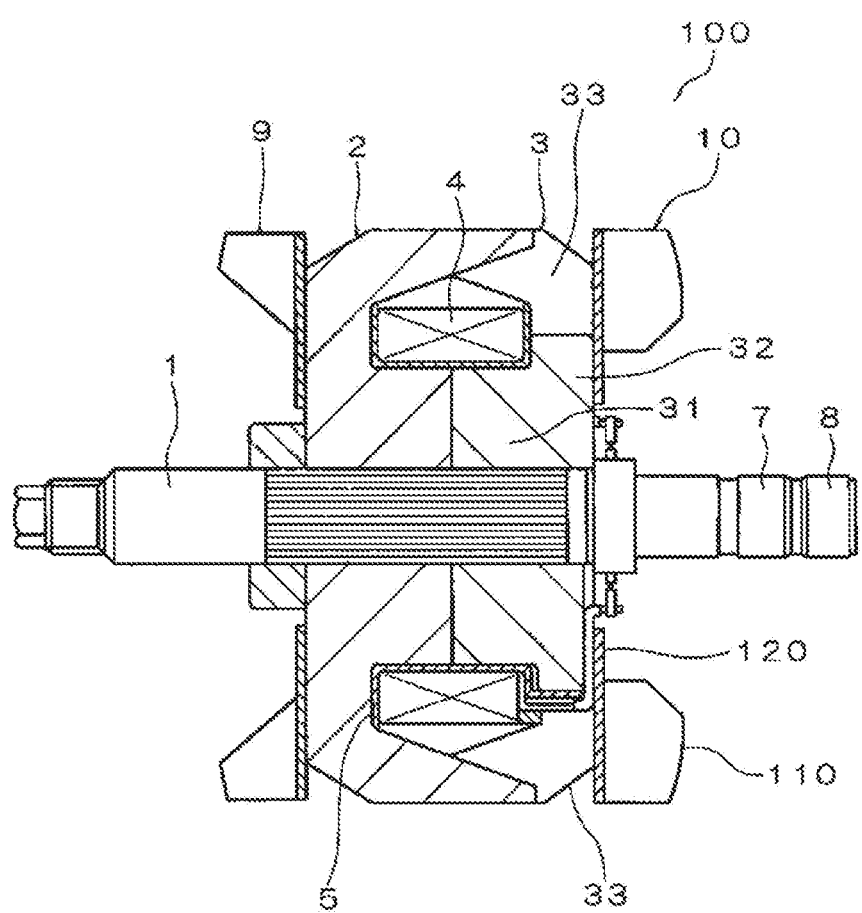
FIG. 1 is a sectional view showing a rotor of a vehicle AC generator according to Embodiment 1 of the present invention.
Figure 2:
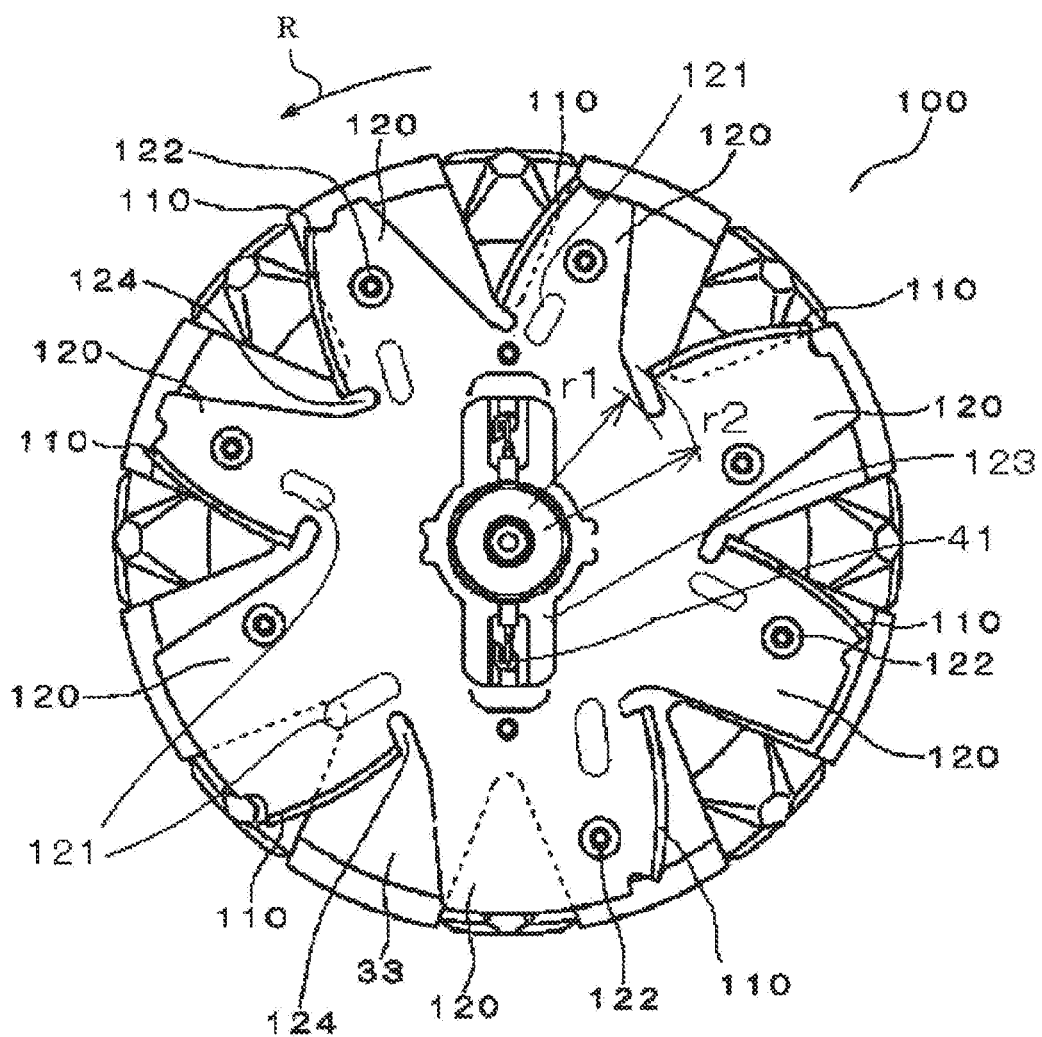
FIG. 2 is a side view showing a cooling fan on the rear side in the rotor of the vehicle AC generator according to Embodiment 1 of the present invention.
Figure 3:
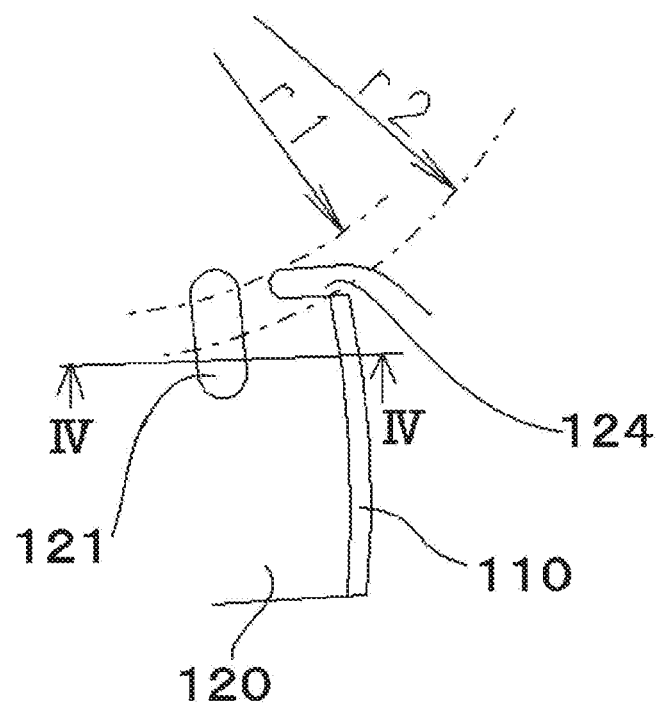
FIG. 3 is a relevant part enlarged view showing a relevant part of the cooling fan in the rotor of the vehicle AC generator according to Embodiment 1 of the present invention.
Figure 4:
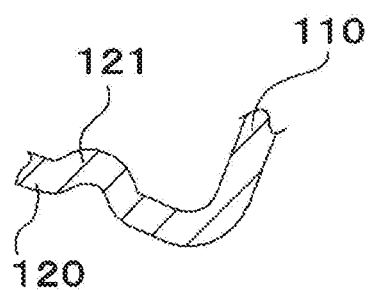
FIG. 4 is a sectional view taken along the line IV-IV of FIG. 3 of the rotor of the vehicle AC generator according to Embodiment 1 of the present invention.

Hereinafter, Embodiment 1 of the present invention will be described with reference to FIGS. 1 to 4. Then, in each of the drawings, identical or equivalent members and portions will be described with the same reference numerals assigned thereto. FIG. 1 is a sectional view showing a rotor of a vehicle AC generator according to Embodiment 1 of the present invention. FIG. 2 is a side view showing a cooling fan on the rear side in the rotor of the vehicle AC generator according to Embodiment 1 of the present invention. FIG. 3 is a relevant part enlarged view showing a relevant part of the cooling fan in the rotor of the vehicle AC generator according to Embodiment 1 of the present invention. FIG. 4 is a sectional view taken along the line IV-IV of FIG. 3 of the rotor of the vehicle AC generator according to Embodiment 1 of the present invention.

A rotor 100 in this Embodiment 1 is rotatably supported to a frame of the vehicle AC generator (not shown in the drawings) and is rotatably driven by an engine mounted on a vehicle. The rotor 100 includes a rotating shaft 1; a pair of Lundell type magnetic pole cores 2, 3 fitted onto the rotating shaft 1; a field coil 4 wound around the magnetic pole core 2, 3 via a resin bobbin 5; and cooling fans 9, 10 fixed to the axial end surfaces of the magnetic pole cores 2, 3, respectively.

The magnetic pole core 3 on the rear side has: a columnar boss portion 31 that is rotated integrally with the rotating shaft 1; a disk portion 32 which is formed integrally with the boss portion 31 and is extended on the radial outer side from one axial end surface of the boss portion 31 (an axial external end portion to which the cooling fan 10 on the rear side is fixed); and a plurality of (for example, 8) magnetic pole claws 33 which are formed integrally with the disk portion 32 and are extended individually in the axial direction from an outer circumferential portion of the disk portion 32. Incidentally, the magnetic pole core 2 on the front side also has a shape substantially the same as the shape of the rear side magnetic pole core 3.

The pair of the magnetic pole cores 2, 3 are assembled in a state where the plurality of magnetic pole claws 33 are alternately meshed. Furthermore, the above-mentioned resin bobbin 5 and the field coil 4 wound around thereof are stored in a space surrounded by the boss portion 31, the disk portion 32, and the magnetic pole claws 33 of the Magnetic pole cores 2, 3. A field current flows in the field coil 4 via slip rings 7, 8, whereby the magnetic pole cores 2, 3 are magnetized into an N-pole at one thereof and into an S-pole at the other thereof.

Next, the cooling fan 10 fixed to the axial end surface of the rear side magnetic pole core 3 will be described in detail. FIG. 2 is a view showing the detailed shape of the rear side cooling fan 10 and shows the shape in which the rotor 100 is viewed from the slip ring 7, 8 sides.

As shown in FIG. 2, the cooling fan 10 includes: seven blade portions (hereinafter, referred to as fan blades) 110 which are each formed in a curve shape curved in a direction opposite to the rotational direction R of the rotor 100 with the approach to an outer diameter direction and are each arranged in a standing condition along the axial direction, the seven blade portions 110 being arranged at unequal angular pitches; and a base portion (hereinafter, referred to as a fan base) 120 which retains these fan blades 110 and is fixed to the axial end surface of the magnetic pole core 3. The cooling fan 10 generates a cooling wind that cools a heating portion (for example, a rectifier, a winding of a stator, and the like (not shown in the drawing)) by rotating integrally with the rotor 100.

The fan base 120 is welded and fixed to the axial end surface of the magnetic pole core 3 by, for example, seven welding portions 122. Furthermore, an opening portion 123 serving as an escape for a connection portion 41 of an end portion (not shown in the drawing) of the field coil 4 and the slip rings 7, 8 is formed in the fan base 120 around the rotating shaft 1.

Furthermore, a narrow groove-shaped cutout portion 124 is provided corresponding to each of the fan blades 110 in the fan base 120 on the inner diameter side (the side near to the center axis) of the fan blade 110 for the purpose of relieving stress in cutting and raising the fan blade 110.

Next, a base rib 121 that is a major portion of the present invention will be described by using FIGS. 3 and 4.

The base rib 121 is provided in the fan base 120 continued to the root of each fan blade 110, the base rib being provided apart from the fan blade 110 and raised independently. The root portion at which the fan blade 110 is arranged in the standing condition has an R-shape (FIG. 4) and the base rib 121 having a dome shape is formed apart therefrom by a predetermined distance as the shape of a bottom portion rib. Normally, a flow of cooling air is fast near the fan blade 110; and if the rib is arranged in parallel to the fast flow, the flow is disturbed to generate large noise. However, since the base rib 121 is provided in only the fan base 120 apart from the fan blade 110, such a problem is not likely to be caused.

Furthermore, the base rib 121 is provided across a range at least from a radius of an innermost circumferential side position r1 to a radius of an outermost circumferential side position r2 of the cutout portion 124 (see FIG. 2). This configuration can avoid crack and deformation, which are intensively generated at the cutout portion. More specifically, as can be seen from an enlarged view of FIG. 3, the base rib 121 is provided at least from the radial inner circumferential side toward the radial outer circumferential side of the cutout portion 124 and the fan base 120 serving as the base portion of the outer circumferential side of the fan blade 110a serving as the blade portion is flatly formed.

Further, a portion where the opening portion 123 is radially extended and accordingly strength is likely to be reduced can also be enhanced by the base rib 121.

Furthermore, the base rib 121 is provided in parallel to a direction in which the fan blade 110 is configured. Incidentally, parallelism in this case is permissible if the base rib 121 is extended in a direction substantially along the blade and the base rib 121 is not necessarily formed in the same shape even when the fan blade 110 is the curve shape.

As described above, according to the rotor of the vehicle AC generator of Embodiment 1 of the present invention, the base rib 121 arranged apart from the root of the fan blade secures the strength of the fan base independently of the fan blade, the fan base is suppressed from generating a crack, the rotor in which turbulence is extremely reduced by extending in parallel to the blade can be actualized, and reliability and silent property can be improved.

Embodiment 2

Figure 5:
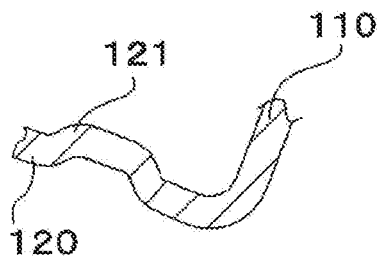
FIG. 5 is a relevant part sectional view showing a relevant part of a cooling fan in a rotor of a vehicle AC generator according to Embodiment 2 of the present invention.

Embodiment 2 of the present invention will be described with reference to FIG. 5. Then, in the drawing, an identical equivalent member and portion will be described with the same reference numeral assigned thereto. FIG. 5 is a relevant part sectional view showing a relevant part of a cooling fan in a rotor of a vehicle AC generator according to Embodiment 2 of the present invention.

The description has been made on the case where the dome shaped base rib 121 is formed as the shape of the bottom portion rib in the above-mentioned Embodiment 1; however, the present invention is not limited to this. For example, as shown in FIG. 5, a base rib 121 in which a flat surface is formed in a part of a dome shape is also permissible and similar effects to the above-mentioned Embodiment 1 can be exhibited. Furthermore, it is also permissible if the size of the base rib 121 is not a single size, and the size of the base rib can be implemented as a size suitable for each base rib.

Embodiment 3

Figure 6:
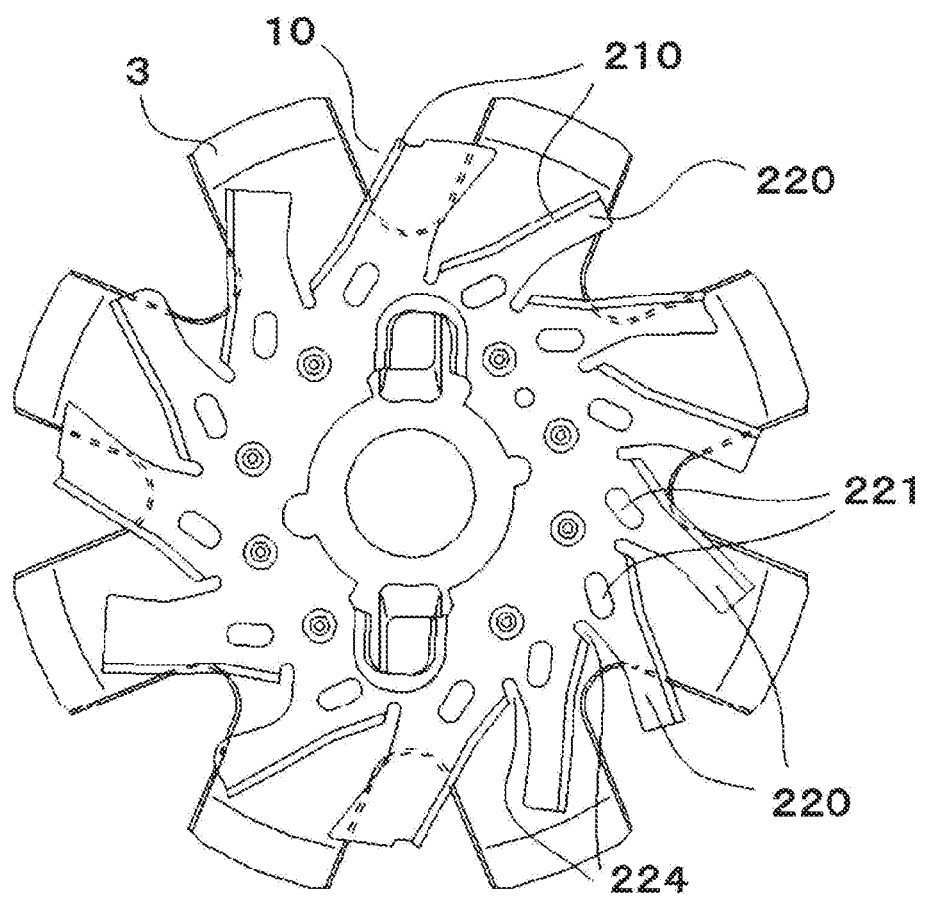
FIG. 6 is a side view showing a cooling fan on the rear side in a rotor of a vehicle AC generator according to Embodiment 3 of the present invention.

Embodiment 3 of the present invention will be described with reference to FIG. 6. Then, in the drawing, identical or equivalent members and portions will be described with the same reference numerals assigned thereto. FIG. 6 is a side view showing a cooling fan on the rear side in a rotor of a vehicle AC generator according to Embodiment 3 of the present invention.

This Embodiment 3 is an example adapted for other fan blade and FIG. 6 shows an example of a cooling fan 10 in which, for example, a concave portion and a convex portion are smoothly continued in a rotational direction. Configuration in which, for example, a base rib 221 to be provided in a fan base 220 is provided in a range between narrow groove-shaped cutout portions 224 is the same as the above-mentioned respective embodiments.

As shown in FIG. 6, even in the case of the fan blade 210 in a state in which the fan blade 210 is not mounted completely on the shaft end surface of a magnetic pole core 3, strength is secured in the fan base 220 at the root of the fan blade 210 and scattering of the fan blade 210 due to a crack mutually between the cutout portions 224 can be avoided.

Furthermore, since the base rib 221 is not provided on the outer diameter side of the fan blade 210, cooling efficiency on the outer diameter side, in which wind speed is faster and a wind flow is apt to be disturbed, is not deteriorated.

Moreover, the description has been made on only the rear side cooling fan 10 in the above-mentioned respective embodiments; however, the present invention can also be applied to the cooling fan 9 on the front side and similar effects can be exhibited.

Additionally, the description has been made on the cooling fan having the fan blades arranged at unequal angular pitches in the above-mentioned respective embodiments; however, the present invention can also be applied similarly to a cooling fan having fan blades arranged at equal angular pitches and similar effects can be exhibited.

Incidentally, the present invention can freely combine the respective embodiments and appropriately modify and/or omit the respective embodiments, within the scope of the present invention.

INDUSTRIAL APPLICABILITY

The present invention is suitable for actualizing a rotor of a vehicle AC generator capable of improving reliability and silent property.

The invention claimed is:

1. A rotor of a vehicle AC generator, comprising:
   a magnetic pole core;
   a field coil wound around said magnetic pole core; and
   a cooling fan fixed to said magnetic pole core,
   wherein said cooling fan includes:
      a base portion fixed to the axial end surface of said magnetic pole core;
      a plurality of blade portions which are each axially arranged in a standing condition from said base portion; and
      a base rib which is provided in said base portion at a position apart from a root portion of each of the plurality of said blade portions and is arranged in parallel to the extending direction of said blade portion.

2. The rotor of the vehicle AC generator according to claim 1,
   wherein said base portion is formed with a cutout portion in a part of said base portion and on the inner circumferential side of said blade portion.

3. The rotor of the vehicle AC generator according to claim 2,
   wherein said base rib is provided at least from the radial inner circumferential side of the cutout portion toward the radial outer circumferential side of the cutout portion and the base portion on the outer circumferential side of the blade portion is flat.

4. The rotor of the vehicle AC generator according to claim 1,
   wherein said base rib has a dome shape with respect to said base portion in an axial direction.

5. The rotor of the vehicle AC generator according to claim 1,
   wherein said dome shape includes a flat surface with respect to said base portion in the axial direction.

* * * * *